United States Patent
Dasgupta et al.

(10) Patent No.: US 12,530,307 B2
(45) Date of Patent: Jan. 20, 2026

(54) ELASTIC BUFFERS

(71) Applicant: NXP USA, Inc., Austin, TX (US)

(72) Inventors: Arindam Dasgupta, Bangalore (IN);
Ranjan Kumar Sahoo, Bangalore (IN);
Anand Shirwal, Bangalore (IN)

(73) Assignee: NXP USA, Inc., Austin, TX (US)

( * ) Notice: Subject to any disclaimer, the term of this patent is extended or adjusted under 35 U.S.C. 154(b) by 257 days.

(21) Appl. No.: 18/301,108

(22) Filed: Apr. 14, 2023

(65) Prior Publication Data
US 2024/0281388 A1 Aug. 22, 2024

(30) Foreign Application Priority Data
Feb. 17, 2023 (IN) .............................. 202341011001

(51) Int. Cl.
*H04L 69/323* (2022.01)
*G06F 1/10* (2006.01)
*G06F 5/06* (2006.01)
*G06F 13/16* (2006.01)

(52) U.S. Cl.
CPC ............ *G06F 13/1673* (2013.01); *G06F 1/10* (2013.01); *G06F 5/06* (2013.01); *G06F 13/1689* (2013.01)

(58) Field of Classification Search
CPC ......... H04L 49/15; H04L 12/56; H04L 45/74; H04L 12/4641; H04L 9/0662; H04L 69/22; H04L 65/1101; H04L 49/90; H04L 49/901; H04L 69/323; H04L 69/324; H04L 25/05; H04L 2012/5674; H04L 49/3018; H04L 49/3027; G06F 13/4282; G06F 12/0815; G06F 13/4068; G06F 13/385; G06F 13/4022; G06F 13/4291; G06F 2212/1016; G06F 13/4221; H03L 7/145

See application file for complete search history.

(56) References Cited

U.S. PATENT DOCUMENTS

| | | | |
|---|---|---|---|
| 5,293,409 A | | 3/1994 | Doornenbal et al. |
| 9,172,379 B1* | | 10/2015 | How ................. G06F 30/34 |
| 9,577,820 B2 | | 2/2017 | Mu et al. |
| 9,774,478 B1* | | 9/2017 | Mendel .............. G06F 5/06 |
| 2013/0191569 A1* | | 7/2013 | Shacham ........... G06F 13/4291 |
| | | | 710/106 |
| 2024/0168710 A1* | | 5/2024 | Nedunuri ............ G06F 5/06 |

OTHER PUBLICATIONS

Winkles, Joe; "Elastic Buffer Implementations in PCI Express Devices"; Mindshare, Inc., Nov. 2003, received from internet https://www.mindshare.com/files/resources/mindshare_pcie_elastic_buffer.pdf, downloaded Dec. 29, 2022, 16 pgs.

* cited by examiner

*Primary Examiner* — Eva Y Puente

(57) ABSTRACT

An elastic buffer module includes: a memory unit configured as an array of memory elements; a write index control module that specifies a range of the memory elements into which a write word from a sequence of input words within input data is to be written into the memory unit; and a read index control module that specifies a range of the memory elements from which a read word is to be read from the memory unit and output as part of a sequence of read words in output data. The input words have a first bit width, the read words have a second bit width, the second bit width is a non-integer multiple of the first bit width, and the first bit width is a non-integer multiple of the second bit width.

18 Claims, 4 Drawing Sheets

ELASTIC BUFFERS

CROSS-REFERENCE TO RELATED APPLICATIONS

This application claims the priority under 35 U.S.C. § 119 of Indian Patent Application number 202341011001, filed on 17 Feb. 2023, the contents of which are incorporated by reference herein.

FIELD OF THE INVENTION

The present invention pertains, among other things, to systems, methods and techniques related to elastic buffers.

BACKGROUND

The following discussion concerns certain background information related to the present invention. However, it should be understood that only knowledge clearly, explicitly and specifically described herein as being "conventional" or "prior art" is intended to be characterized as such. Everything else should be understood as knowledge and/or insight originating from the present inventors.

In a variety of situations, systems or portions of systems operating in different clock domains need to communicate with each other. Even when the nominal clock speeds are the same, there are always variations between any two non-synchronized clocks. An elastic buffer, into which data is written from a first clock domain and from which data is read asynchronously on a first-in-first-out basis into a second clock domain, conventionally is used to address this problem. The present invention is directed to improved elastic buffer designs, e.g., that can accommodate a variety of different environments, particularly environments that would be difficult to accommodate with conventional designs.

SUMMARY OF THE INVENTION

One embodiment of the invention is directed to an elastic buffer module that includes: a memory unit configured as an array of memory elements; a write index control module that specifies a range of the memory elements into which a write word from a sequence of input words within input data is to be written into the memory unit; and a read index control module that specifies a range of the memory elements from which a read word is to be read from the memory unit and output as part of a sequence of read words in output data. The input words have a first bit width, the read words have a second bit width, the second bit width is a non-integer multiple of the first bit width, and the first bit width is a non-integer multiple of the second bit width.

Another embodiment is directed to an elastic buffer module that includes: a memory unit configured as an array of separately addressable single-bit memory elements; a write index control module that specifies a range of the single-bit memory elements into which a write word from a sequence of input words within input data is to be written into the memory unit; and a read index control module that specifies a range of the single-bit memory elements from which a read word is to be read from the memory unit and output as part of a sequence of read words in output data.

A still further embodiment is directed to an elastic buffer module that includes: a memory unit configured as an array of memory elements; a write index control module that specifies a write range of the memory elements into which a write word from a sequence of input words within input data is to be written into the memory unit; a first read index control module that specifies a first range of the memory elements from which a first read word is to be read from the memory unit and output as part of a first sequence of read words in output data; and a second read index control module that specifies a second range of the memory elements from which a second read word is to be read from the memory unit as part of a second sequence of read words. The write word has a write bit width, the first read word has a first read bit width, and the second read word has a second read bit width. At least one of the first and second read bit widths is a non-integer multiple of the write bit width, and the write bit width is a non-integer multiple said at least one of the first and second read bit widths.

Certain more-specific implementations of the foregoing embodiment(s) include one or any combination of the following features.

The memory elements are separately addressable single-bit memory elements.

The input words are sequentially written into the memory unit at a first clock rate, the read words are sequentially read from the memory unit at a second clock rate, the second clock rate is a non-integer multiple of the first clock rate, and the first clock rate is a non-integer multiple of the second clock rate.

The first bit width times the first clock rate is equal to the second bit width times the second clock rate.

The elastic buffer module also includes a central control unit that detects low-buffer-fill and high-buffer-fill conditions and, in response, causes clock-skew-correction symbols to be inserted or deleted, in order to maintain a desired buffer-fill-level range.

When the low-buffer-fill condition is detected, at least one additional clock-skew-correction symbol, not within the input data, is written into the memory unit, and when the high-buffer-fill condition is detected, at least one clock-skew-correction symbol within the input data is omitted from being written into the memory unit.

When the high-buffer-fill condition is detected, data writing is paused, e.g., meaning that incoming input data or input data words are skipped over, i.e., not written into the memory unit. Preferably, this only occurs when clock-skew-correction symbol(s) are present in the input data, so only the writing of such symbol(s) is paused.

When the high-buffer-fill condition is detected, only a subset of the bits in the write word are written into the memory unit.

The input words are sequentially written into the memory unit at a first clock rate, the read words are sequentially read from the memory unit at a second clock rate, the second clock rate is a non-integer multiple of the first clock rate, and the first clock rate is a non-integer multiple of the second clock rate.

The input words are sequentially written into the memory unit at a write clock rate, the first read words are sequentially read from the memory unit at a first read clock rate, the second read words are sequentially read from the memory unit at a second read clock rate, and wherein the write clock rate is a non-integer multiple of at least one of the first read clock rate or the second read clock rate, and said at least one of the first read clock rate or the second read clock rate is a non-integer multiple of the write clock rate.

The write bit width times the write clock rate is equal to the first read bit width times the first read clock rate and is equal to the second read bit width times the second read clock rate.

The elastic buffer module also includes: a first central control unit that detects first low-buffer-fill and first high-buffer-fill conditions and, in response, causes clock-skew-correction symbols to be inserted or deleted, in order to maintain a desired first buffer-fill-level range, relative to reading of the first read words; and a second central control unit that detects second low-buffer-fill and second high-buffer-fill conditions and, in response, causes clock-skew-correction symbols to be inserted or deleted, in order to maintain a second desired buffer-fill-level range, relative to reading of the second read words.

When the first low-buffer-fill condition is detected, at least one additional clock-skew-correction symbol, not read from the memory unit, is inserted into the output data, when the first high-buffer-fill condition is detected, the first range is advanced, thereby skipping reading at least one clock-skew-correction symbol within the memory unit, when the second low-buffer-fill condition is detected, at least one additional clock-skew-correction symbol, not read from the memory unit, is inserted into the second sequence of read words, and when the second high-buffer-fill condition is detected, the second range is advanced, thereby skipping reading at least one clock-skew-correction symbol within the memory unit.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the accompanying drawings. However, it should be understood that the drawings merely depict certain representative and/or exemplary embodiments and features of the present invention and are not intended to limit the scope of the invention in any manner. The following is a brief description of each of the accompanying drawings.

DESCRIPTION OF THE PREFERRED EMBODIMENT(S)

For ease of reference, the present disclosure is divided into sections. The general subject matter of each section is indicated by that section's heading. However, such headings are included simply for the purpose of facilitating readability and are not intended to limit the scope of the invention in any manner whatsoever. As used herein, the term "single-port buffer" refers to a buffer having a single read port, and the term "multiport buffer" refers to a buffer having two or more read ports.

Single-Port Buffer System.

Figure 1:
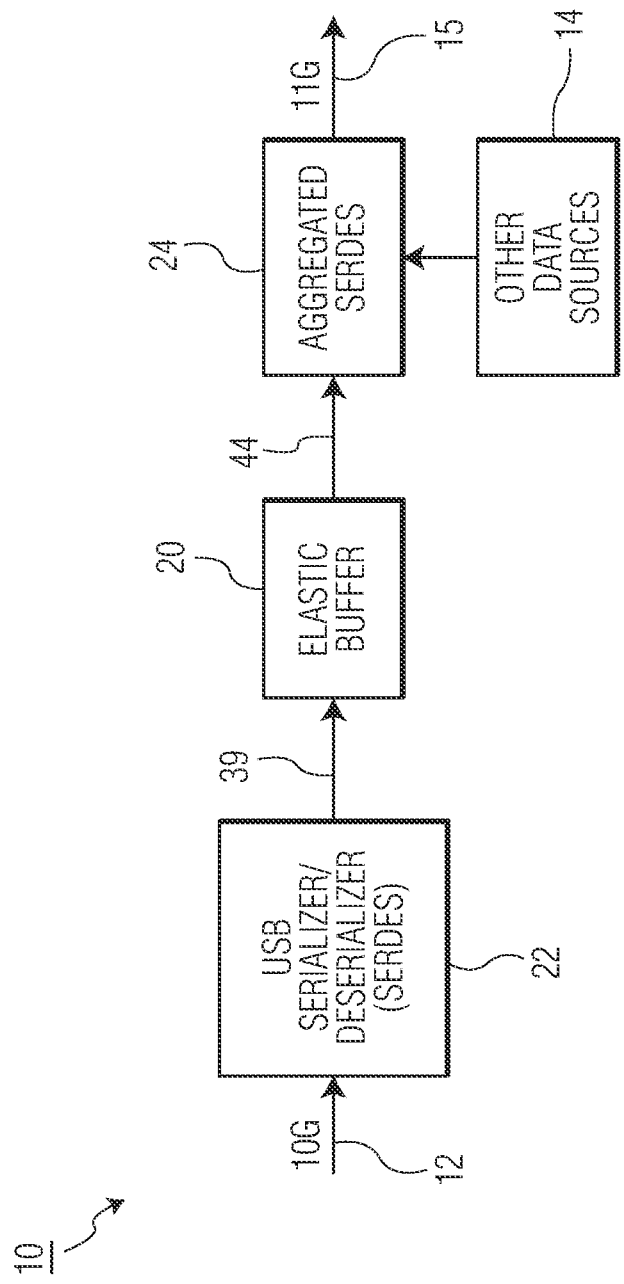
FIG. 1 is a block diagram of a single-port buffer system according to a representative embodiment of the present invention.

A single-port buffer system 10 according to the present invention is shown in FIG. 1. Generally speaking, system 10 is an aggregator and retimer system, with data provided from multiple sources, specifically, input data 12 that has been generated in a first clock domain and local data from one or more other sources 14 that has been generated in a second clock domain, with the second clock domain being: (1) different than the first clock domain and (2) the domain in which the output data 15 is to be provided. In the current embodiment, the input data 12 is Universal Serial Bus (USB) 3.2 data; however, it should be noted that such data could (in alternate embodiments) be replaced with any other type of data, and any references to USB data herein can be replaced with corresponding references to any other type of data. Similarly, in the current specific embodiment, the other data source(s) 14 include universal asynchronous receiver-transmitter (UART) data; however, it should be noted that any other kind(s) of data could (in alternate embodiments) be included in the other data source(s) 14, e.g., in addition to or instead of UART data.

In the current embodiment, the design is complicated by virtue of the fact that the output aggregated data rate (i.e., the rate of output data 15) is a non-integral multiple of the input data rate (i.e., the rate of input data 12). In order to bridge these two clock domains (which use separate nonsynchronized reference clocks), an elastic buffer module 20 according to the present invention is used. As shown in FIG. 1, in the current embodiment, the input data 12 is first converted into fixed-length words (each such word being 16 bits long or wide in the current embodiment) in serializer/deserializer (SerDes) 22, and then those fixed-length words are written into elastic buffer module 20. Aggregated SerDes 24 then reads fixed-length words from elastic buffer module 20, aggregates that data with the data received from the other data source(s) 14, and provides the output serial data at the desired output aggregated data rate.

In this particular design problem, the voltage-controlled oscillator (VCO) frequency in the first clock domain (for input data 12 i.e., the domain in which data is written into the elastic buffer module 20) is 5 gigahertz (G) with both clock edges being used, so as to support the USB 3.2 10G data rate. On the other hand, the desired aggregated output data rate is 11G (e.g., after combining the 10G input USB data 12 with 1G of UART data 14), again using both clock edges, so the VCO frequency in the read clock domain (i.e., the domain in which data is read from the elastic buffer module 20) is 5.5G.

In conventional elastic-buffer systems, this non-integral multiple between the write-domain and read-domain clock speeds would be difficult and complicated to accommodate. As noted above, the write word length is 16 bits. Thus, the write clock speed is 10G/16=625 megahertz (M), requiring a clock division factor of 5G/625M=8, which (being an integer) is easy to achieve (e.g., using a digital clock divider). On the other hand, on the read side, using a conventional architecture, the required clock division factor would be 5.5G/625M=8.8, which is not at all easy to achieve.

One potential approach to address this problem would be to use a different VCO on the read side, e.g., operating at 15G. While this approach would make it easier to achieve the desired read rate (15G/625M=24, i.e., an integer clock division factor), we then would be left with the problem of generating the desired 11G output rate from a 15G rate, which also would be very difficult and/or complicated to achieve.

The present invention provides a simpler, more elegant solution by using different read and write word lengths or widths. Specifically, in the current example, the read data word width is set to 20 bits (while the write data word length remains 16 bits). As a result of doing so, the data read rate is required to be 10G/20=500M which requires a read clock division factor of 5.5G/500M=11. Because this is an integer value, it is easy to achieve.

Figure 2:
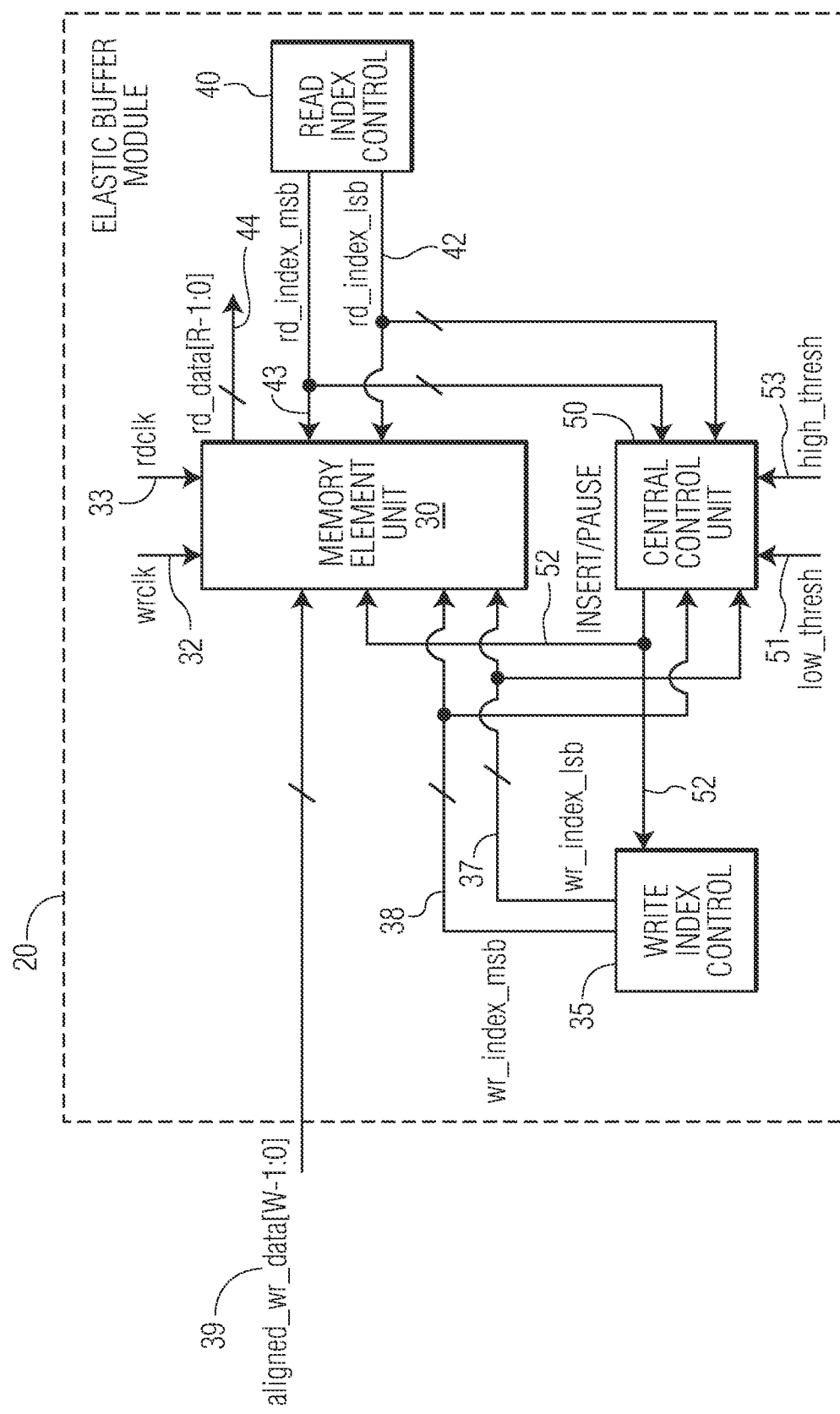
FIG. 2 is a block diagram of a single-port elastic buffer module according to a representative embodiment of the present invention.

To achieve the capability of allowing data to be written in a first word width and then read in a second/different word width, in the preferred embodiments, elastic buffer module 20 differs from a conventional elastic buffer, e.g., in the following respects. A conventional elastic buffer typically includes a memory unit that is structured as an array of fixed-length multi-bit words (e.g., each word being eight bits wide). From the write side, data is written into the memory unit in these fixed-length multi-bit words. From the read side, data is read from the memory unit (asynchronously relative to the data-write operations) in these same fixed-length multi-bit words. In contrast, referring to FIG. 2, elastic buffer module 20 uses a memory unit 30 comprised of a chain of single-bit memory elements (e.g., flip-flops) that preferably can be written to and read from in arbitrary word lengths, thereby allowing for flexible incorporation into different systems, having different clock-domain-matching requirements.

The write clock signal (wrclk) 32 (recovered from the input USB data 12 and having a frequency of f_wr, which is 625M, in the present example) and read clock signal (rdclk) 33 (having a frequency of f_rd, which is 500M in the present example) are input into elastic buffer module 20 and used to control when a word is written into or read from, respectively, memory unit 30. Generally speaking, elastic buffer module 20 works as follows.

On the write side, write index control module 35 specifies the index 37 for the least significant bit (write_index_lsb) and the index 38 for the most significant bit (write_index_msb) of the location in the memory unit 30 at which the current word (of length or width 'W', which in this example is 16 bits) of aligned_wr_data 39 (provided by SerDes 22) is to be written on the current pulse of write clock signal (wrclk) 32. Note that, for each write operation, write_index_msb=write_index_lsb+W−1. After the current write operation has been completed, both the write_index_lsb 37 and the write_index_msb 38 are incremented by write word size W, and the foregoing process repeats.

Similarly, on the read side, read index control module 40 specifies the index 42 for the least significant bit (read_index_lsb) and the index 43 for the most significant bit (read_index_msb) of the location in the memory unit 30 from which the current word (of length 'R', which in this example is 20 bits) is to be read on the current pulse of read clock signal (rdclk) 33 and then subsequently output as part of rd_data 44. Similar to the data-writing operation, for each read operation, read_index_msb=read_index_lsb+R−1. After the current read operation has been completed, both the read_index_lsb 42 and the read_index_msb 43 are incremented by read word size R, and the foregoing process repeats.

For both the write and read sides, the addressing is circular based on the size or depth L of the memory array 30. That is, each of the address or index increments, differences and other calculations noted herein should be understood as being modulo L. Also, it is noted that, in the embodiments described herein, the locations at which a words is to be written into or read from the memory unit of an elastic buffer are specified using the index for the least significant bit (lsb) and the index for the most significant bit (msb) of the word. However, this approach is merely exemplary, and any other approach to specifying the desired range of memory elements instead may be used.

Because of the finite size of the memory array 30 (i.e., L bits long or deep), as well as parts per million (ppm) variations in the clock rates on the write and read sides, there often are corresponding variations (from the nominal rates noted above) in the rates at which data actually is written into and then read out of memory array 30. As a result, correction is performed. Specifically, in the current embodiment, this task is performed by the central control unit 50.

For USB 3.2 data (which is the input data 12 the current embodiment): (1) SKP Ordered Sets are used within the data stream to accommodate (i.e., allow compensation for) frequency differences between the two ends of the USB link; (2) a SKP Ordered Set is transmitted on average once every 40 blocks (with each block being 132 bits long and each SKP Ordered Set including four 8-bit SKP symbols); and (3) in the worst-case scenario, 1060 bytes of data (the maximum USB 3.2 packet size) are transmitted between consecutive SKP Ordered Sets (which are not permitted to be inserted within any data packet), at which point catch-up SKP Ordered Set(s) can be transmitted. In view of the foregoing considerations, as well as the USB 3.2 maximum permitted clock skew, it can be shown that the maximum drift for the average case is approximately +4 SKP symbols, and the maximum drift for the worst case is approximately +10 SKP symbols. As a result, and in order to accommodate the worst-case scenario, in the current embodiment, memory unit 30 (which system 10 attempts to keep half full, i.e., so that 50% of its capacity has data written to it that has not yet been read) is made capable of accommodating a drift of +11 SKP symbols (i.e., L=2*11*8=176 bits). It is noted that the maximum drift preferably is only used to determine the minimum size or depth of memory unit 30, and it often will be desirable to use a larger size or depth, e.g., to ease the implementation of the pointers or pointer logic. It is further noted that, while this size is appropriate for USB 3.2, other data standards use other kinds of clock-skew-accommodation/correction (or ppm-compensation) symbol sets (e.g., IDLE symbols for the Ethernet standard) and have other specifications, so a different size (e.g., calculated in a similar manner, so as to accommodate the maximum drift between transmission of ppm-compensation symbol sets, but preferably just slightly larger than that amount so as to minimize the amount of chip area required) often will be appropriate for such other data standards. Although the present discussion refers to SKP symbols and ordered sets, it should be noted that such references can be replaced with references to any other ppm-compensation symbols and/or ordered sets.

The main factor considered with respect to skew correction is the fill_level of the memory array 30 which, in the current embodiment, is determined as a function of the difference between the write location and the read location, e.g., $$\text{fill\_level} = (\text{write\_index\_lsb} - \text{read\_index\_lsb})\% \ L.$$

The fill_level essentially is an indication of the number of extra bits in the memory array 30 that have not yet been read. Upon determining the fill_level, the central control unit 50 detects when either of the following conditions occurs: (1) the fill_level falls below a first specified threshold low_thresh 51 (e.g., 15-25% of its capacity, as a result of the read clock rdclk 33 being faster than the write clock wrclk 32), in which case the central control unit 50 generates and provides an "insert" command on line 52, which goes to the write side of memory unit 30 (specifically, to the memory unit 30 and to the write index control module 35), e.g., essentially inserting additional SKP symbol(s); or (2) the fill_level exceeds a second specified threshold high_thresh 53 (e.g., 75-85% of its capacity, as a result of the write clock wrclk 32 being faster than the read clock rdclk 33), in which case the central control unit 50 generates and provides a "pause" command on line 52, which again goes to the write side of memory unit 30 (specifically, the memory unit 30 and the write index control module 35), e.g., essentially deleting SKP symbol(s), as discussed in the following paragraph.

More preferably, when a SKP Ordered Set is detected, if either of the foregoing fill_level conditions has been satisfied, the appropriate correction (identified above) is applied, by inserting or deleting 4SKPs in the current embodiment. These corrections involve appropriate adjustment of the write and/or read indices from what their values would be in the absence of a correction. Because the write interface width in the current specific embodiment is an integer multiple of bytes (specifically, in this case, 2 bytes or 16 bits), applying the correction only on the write side eases the write pointer management while doing the correction. SKP addition can be implemented by writing 4 additional SKP symbols (for a total of 32 bits) and simultaneously incrementing the write_index_lsb (which, as noted above, also increments the write_index_msb) by 2*16, i.e., 32. SKP deletion is handled in the current embodiment by pausing the write_index_lsb and write_index_msb for 2 write clock cycles. Similarly, in other embodiments, if the read width is an integer multiple of bytes, then applying the correction only on the read side eases the read pointer management while doing correction.

However, in an embodiment in which the write width is not an integer multiple of 8, correction is a bit trickier. For example, in an embodiment in which the write width W is 20 bits, SKP addition and deletion could be performed as follows. For SKP addition, 4 SKP symbols (or 32 bits) are inserted and simultaneously the write_index_lsb is incremented by 32. For SKP deletion, 4 SKP symbols (or 32 bits) are to be deleted, which can be achieved by: (1) pausing the first 20-bit write cycle, resulting in the deletion of 20 bits; and (2) in the next 20-bit write cycle, flushing 12 bits and writing the residual 8 bits, while also incrementing the wr_index_lsb (which, as noted above, also increments the write_index_msb) by 8. Generally speaking, the write operation is suspended for int(32/W) write clock cycles, and the write_index_lsb is incremented by W−(32% W), where ' % ' denotes the modulo operator.

The foregoing embodiment provides a means to achieve width conversion and ppm compensation with minimal impact on latency. In addition, it entirely removes the constraint of choosing the width of the buffer memory based on SKP symbol width (which is standard in conventional elastic buffers). The buffer size can then be determined solely based on the ppm difference between the source and destination clocks and the maximum interval between SKP symbols. Also, because the data on each of the write side and the read side is accessed via least-significant-bit (lsb) and most-significant-bit (msb) indices, respectively, the write and read widths can be independently determined based on other factors in the design, e.g., based on the clocking requirements. Finally, this architecture also helps to meet strict latency requirements of retimer/aggregator systems, because it eliminates the need to use any additional gearbox or first-in-first-out (FIFO) buffer(s) to handle width conversion.

In the preferred embodiments of the present invention: (1) the elastic buffer module 20 operates in a nominal half-full mode of operation; (2) the capacity of the elastic buffer module 20 (e.g., memory unit 30) is twice the buffering requirement from the worst-case scenario symbol-shift calculation; (3) the memory element (e.g., memory unit 30) of the elastic buffer module 20 is implemented as a one-dimensional array of flip flops or other single-bit memory elements; (4) the ratio of the input and output clock frequencies is not required to be an integer; (5) the source logic can operate on one frequency and the destination logic can operate on a different frequency; and/or (6) low latency is provided as there is no additional gearbox to do width conversion. It is noted that the foregoing structures and processes generally can be implemented in any system in which $f\_wr \times W = f\_rd \times R$.

As discussed above, the present invention can be used with any kind of special symbols (e.g., SKP or IDLE) for clock ppm compensation. As a result, the present invention can be directly applied to applications related to USB/PCIe/Ethernet or any other standard that uses the same basic principle to achieve clock tolerance compensation. Moreover, the present invention is particularly well-suited to applications where the data on the read side (destination) is free-flowing and cannot be stalled to do the ppm adjustment such as retimer/aggregator systems and/or applications.

Multiport-Buffer System.

Figure 3:
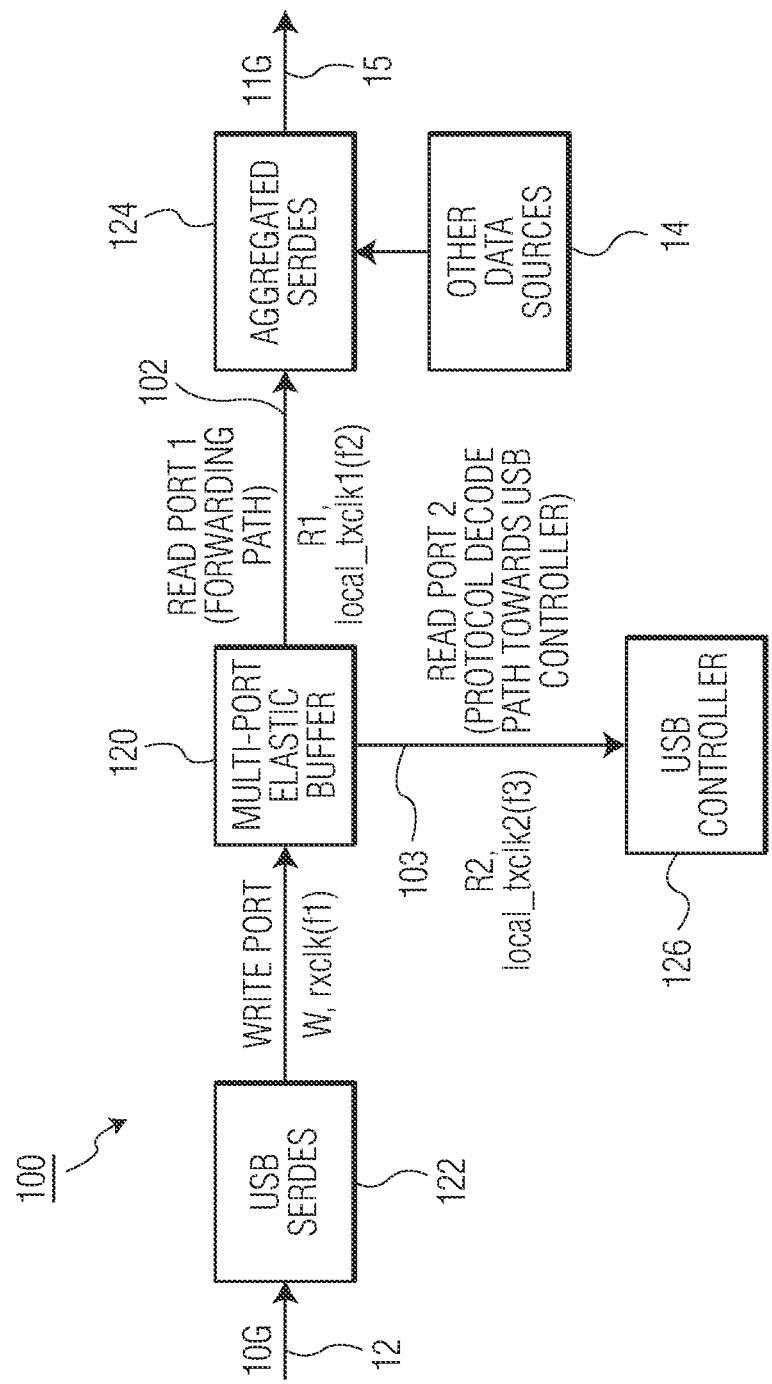
FIG. 3 is a block diagram of a multiport buffer system according to a representative embodiment of the present invention.

In a system 100, according to an alternate embodiment of the present invention, as shown in FIG. 3, the path originating from the input data 12, which is USB 3.2 data in the preceding and current examples, is split into two different paths on the read side of the elastic buffer (in this embodiment, multiport elastic buffer module 120): (1) a forwarding path 102 (e.g., similar or identical to the read side of the preceding embodiment and having the same considerations); and (2) a protocol-decode path 103. Similar to the previous embodiment, different clock domains exist on the write and read sides of multiport elastic buffer module 120. As a result, in the current embodiment as well, different word lengths can be used on the on the write and read sides. In the present specific embodiment, however, while multiport elastic buffer module 120 also has one write port, in contrast to the previous embodiment, it has two read ports, with each of the write port and two read ports having its own clock domain.

Generally speaking, the present embodiment can be understood as an extension of the previous embodiment, in which an additional read port/path (i.e., protocol-decode path 103), having its own clock domain, is also included. Accordingly, as a general rule, the same considerations discussed above in connection with the preceding embodiment also apply with respect to this embodiment, except as expressly noted otherwise in the present discussion. In the current embodiment, a single elastic buffer module 120 receives data from a recovered clock domain (recovered from the input USB data 12 in the current specific embodiment) and transfers such data onto two different paths 102 and 103, each having its own local clock and, therefore, its own ppm variation. Forwarding path 102 is used to forward the data to the other (aggregated) end of the link, resulting in output data 15 (which, in the current specific embodiment, similar to the previous embodiment, is a combination of the input USB data 12 and UART data 14), and path 103 is used in parallel to decode the protocol data. As in the previous embodiment, in the current embodiment there is a strict latency requirement that has to be met for the end-to-end path.

Here, 'W' is still used to designate the width of the word used on the write side. However, because different considerations influence the decision about choosing a data-read-word width on the forwarding path 102 versus the protocol-decode path 103, different read-word lengths (designated 'R1' and 'R2', respectively) preferably can be (and are in the current specific embodiment) used for reading from elastic buffer module 120. In the current specific embodiment, the read clock domain for the forwarding path 102 (corresponding to read-word length R1) is derived from a transmit phase-locked loop (PLL) clock on the aggregated end of the link, and the read clock domain for the protocol-decode path 103 (corresponding to read-word length R2) is derived from the PLL for SerDes 122.

The write word length (or width) W preferably is determined based on the nature of the input data (which is USB 3.2 in the current example, so the width preferably corresponds to the USB SerDes 122 data width) and/or the ppm-compensation word length (W=16 in the current embodiment), and the write clock is the USB SerDes 122 recovered clock. The word length R1 preferably is determined, e.g., based on factors such as: (1) different sources of aggregation such as USB, UART, etc., which in turn leads to non-integral ratios between incoming and outgoing rates; (2) ease of generation of transmit VCO frequency based on the aggregated output rate of the link; and/or (3) the parallel width of SerDes 124 (on the aggregated end of the link). The width R2 preferably is determined, e.g., based on the implementation of controller 126 (a USB controller in the current embodiment), e.g., which follows a standard PIPE (Physical Interface for PCI Express) interface. R2=16 in the current embodiment.

Figure 4:
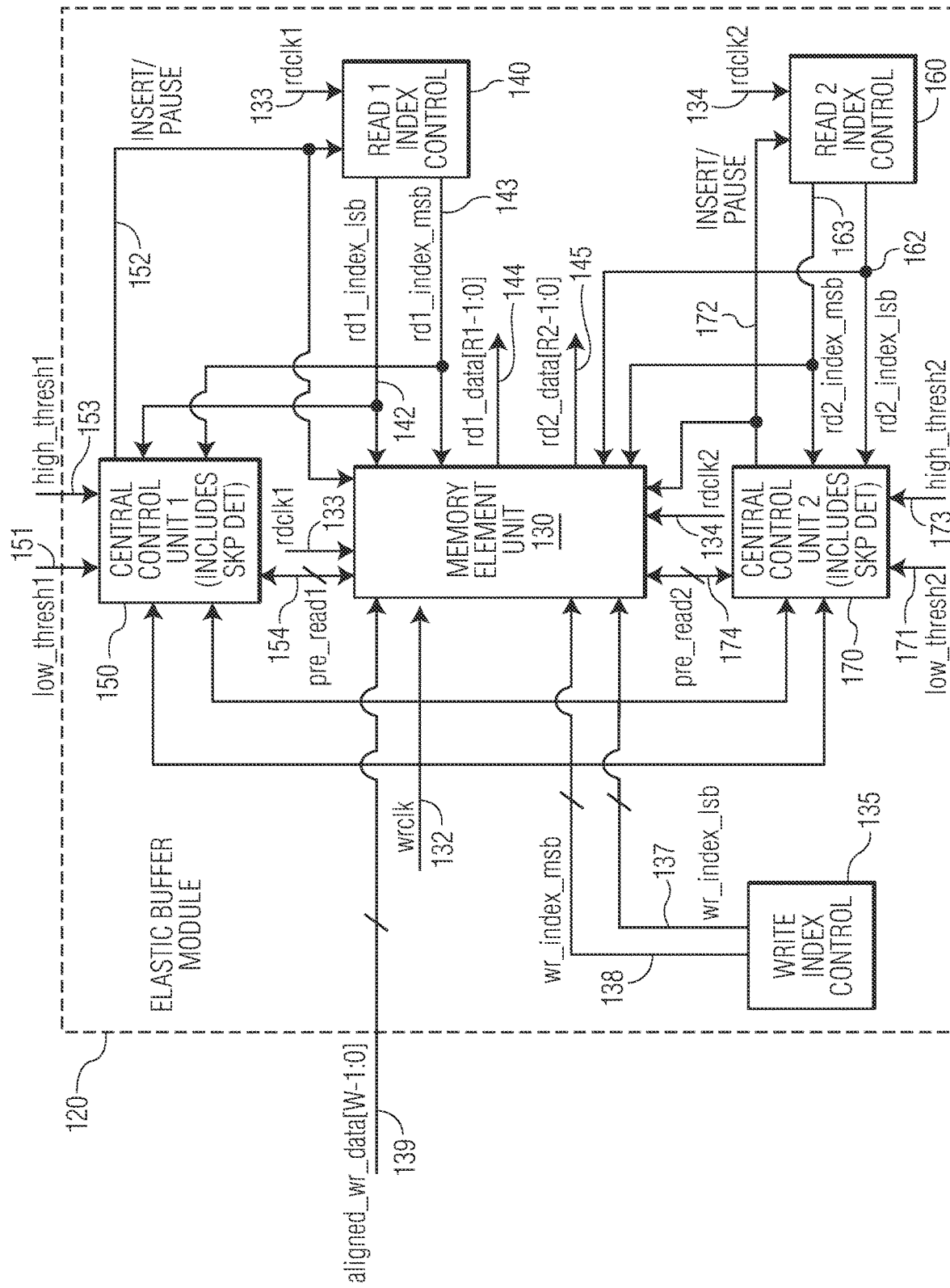
FIG. 4 is a block diagram of a multiport elastic buffer module according to a representative embodiment of the present invention.

A specific embodiment is now described, with additional reference to FIG. 4, in which: (1) the write width W is 16 bits; (2) the write clock signal ('wrclk', which in the current embodiment is recovered from the input USB data 12) has a frequency of 'f1_wr' of 625M (i.e., derived from 10G on the source end); (3) the read width R1 (for the forwarding path 102) is 20 bits; (4) the read clock signal for the forwarding path 102 ('rdclk1') has a frequency 'f1_rd' of 500M (derived from the 11G transmit PLL on the aggregated end of the link); (5) the read width R2 (for the protocol-decode path 103) is 16 bits; and (6) the read clock signal for the protocol-decode path 103 ('rdclk2') has a frequency 'f1_rd' of 625M. It is noted that these parameters satisfy the condition identified above (in the single-read-port embodiment), but in this case, for all three ports, i.e., f_wr×W=f1_rd×R1=f2_rd×R2=10G. In fact, the parameters for the write side are identical in the two embodiments, and the parameters for the read path 102 and the current embodiment identical to the parameters of the read side in the preceding embodiment.

Similar to elastic buffer module 20, multiport elastic buffer module 120 uses a memory unit 130 comprised of a chain of single-bit memory elements (e.g., flip-flops) that preferably can be written to and read from in arbitrary word lengths, thereby allowing for flexible incorporation into different systems, having different clock-domain-matching requirements. However, several distinctions exist. First, in addition to a write index control module 135 for the write side and a read index control module 140 and a central control unit 150 for the forwarding path 102, multiport elastic buffer module 120 also includes a read index control module 160 and a central control unit 170 for the protocol-decode path 103. Second, in the present embodiment, SKP addition/removal is performed on the read side (within each of forwarding path 102 and protocol-decode path 103), as discussed in greater detail below.

Because the input data 112 in the current embodiment is again USB 3.2 data, the considerations and conclusions pertaining to maximum SKP-symbol drift are the same as in the preceding embodiment. Accordingly, similar to the previous embodiment, in the current embodiment, memory unit 130 also has a length (or depth) of L=176 bits (e.g., 176 flip-flops or other single-bit memory elements). However, because the two are indifferent clock domains, path 102 typically will have a different skew, relative to the write side, than path 103. As a result, in the current embodiment, ppm compensation is done on the read side, independently in each of path 102 and 103. Specifically, in this embodiment, ppm compensation is performed in central control unit 150 for the forwarding path 102 and in central control unit 170 for the protocol-decode path 103.

On the write side, write index control module 135 specifies the index 137 for the least significant bit (write_index_lsb) and the index 138 for the most significant bit (write_index_msb) of the location in the memory array 130 at which the current word (of width W, which again, in this embodiment is 16 bits) of aligned_wr_data 139 (provided by SerDes 122) is to be written on the current pulse of write clock signal (wrclk) 132. For the each write operation, write_index_msb=write_index_lsb+W−1. After the current write operation has been completed, both the write_index_lsb 137 and the write_index_msb 138 are incremented by write word size W, and the foregoing process repeats.

On the read side, in forwarding path 102, read 1 index control module 140 specifies the index 142 for the least significant bit (read1_index_lsb) and the index 143 for the most significant bit (read1_index_msb) of the location in the memory unit 130 at which the current word (of width R1, which again, in this embodiment also is 20 bits) is to be read on the current pulse of read clock signal (rdclk1) 133 and then subsequently output as part of rd1_data 144. Similar to the data-writing operation, for each read operation, read1_index_msb=read1_index_lsb+R1−1. After the current read operation (in forwarding path 102) has been completed, both the read1_index_lsb 142 and the read1_index_msb 143 are incremented by read word size R1, and the foregoing process repeats.

Similarly, in protocol-decode path 103 on the read side, read 2 index control module 160 specifies the index 162 for the least significant bit (read2_index_lsb) and the index 163 for the most s significant bit (read2_index_msb) of the location in the memory unit 130 at which the current word (of width R2, which again, in this embodiment is 16 bits) is to be read on the current pulse of read clock signal (rdclk2) 134 and then subsequently output as part of rd2_data 145. For each read operation (in protocol-decode path 103), read2_index_msb=read2_index_lsb+R2−1. After the current read operation has been completed, both the read2_index_lsb 162 and the read2_index_msb 163 are incremented by read word size R2, and the foregoing process repeats.

As in the previous embodiment, all addressing is circular based on the size or depth L of the memory array 130. That is, each of the address or index increments, differences and other calculations noted herein should be understood as being modulo L. Also as in the previous embodiment, the main factor considered with respect to ppm compensation is the fill_level of the memory array 130 which, in the current embodiment, is determined as a function of the difference between the write location and the subject read location, as discussed above. However, in this case, because there are two separate sets of read pointers (one for the forwarding path 102 and one for the protocol-decode path 103), a corresponding fill_level_1 and fill_level_2, respectively, are monitored and controlled (by central control unit 150 and central control unit 170, respectively), e.g., with:

$$\text{fill\_level\_1} = (\text{write\_index\_lsb} - \text{read1\_index\_lsb})\% \ L;$$

and $$\text{fill\_level\_2} = (\text{write\_index\_lsb} - \text{read2\_index\_lsb})\% \ L.$$

In the preferred embodiments of a multiport implementation: (1) if the two local read clocks, i.e., rdclk1 133 and rdclk2 134, are derived from the same source and have zero ppm difference, then the SKP addition or deletion happens only on the write side; or (2) if the two local read clocks, i.e., rdclk1 and rdclk2, are derived from the different sources (which is the case in the current specific embodiment), or in the event they are derived from the same source but have independent spread-spectrum-clocking (SSC) profiles, then the SKP addition or deletion happens on the read side (preferably, only on the read side, although in certain alternate embodiments, it is performed both on the read side and on the write side, with the latter being effective in particular instances when both read-clock signals are similarly skewed relative to the write-clock signal). SKP addition and deletion on the write side is discussed above in connection with the preceding embodiment, and the same techniques can be used in this embodiment when write-side compensation is to be performed.

However, in the current embodiment, only read-side ppm compensation is performed. For that purpose, pre_read signals 154 and 174 are used to prefetch contents of the memory unit 130 in order to detect the presence of SKP symbols, in which case, ppm compensation is possible at that point by central control unit 150 or central control unit 170, respectively. Upon such a detection, the following processing.

Central control unit 150 (on the forwarding path 102) detects when either of the following conditions occurs: (1) the fill_level_1 falls below a first specified threshold low_thresh1 151 (e.g., 15-25% of its capacity, as a result of the read clock rdclk1 133 being faster than the write clock wrclk 132), in which case the central control unit 150 generates and provides an insert/pause command on insert/pause line 152, which goes to the forwarding path 102 read side of memory unit 130 (specifically, to the memory unit 130 and to the read 1 index control module 140), e.g., essentially pausing reading from the memory unit 130 while instead inserting additional SKP symbol(s); or (2) the fill_level_1 exceeds a second specified threshold high_thresh1 153 (e.g., 75-85% of its capacity, as a result of the write clock wrclk 132 being faster than the read clock rdclk1 133), in which case the central control unit 150 generates and provides a skip command on line 152, which again goes to the forwarding path 102 read side of memory unit 130 (specifically, to the memory unit 130 and to the read 1 index control module 140), e.g., causing the read indices 142 and 143 to advance and skip over, essentially deleting, SKP symbol(s).

Similarly, central control unit 170 (on the protocol-decode path 103) detects when either of the following conditions occurs: (1) the fill_level_2 falls below a first specified threshold low_thresh2 171 (e.g., 15-25% of its capacity, as a result of the read clock rdclk2 134 being faster than the write clock wrclk 132), in which case the central control unit 170 generates and provides an insert/pause command on insert/pause line 172, which goes to the protocol-decode path 103 read side of memory unit 130 (specifically, to the memory unit 130 and to the read 2 index control module 160), e.g., essentially pausing reading from the memory unit 130 while instead inserting additional SKP symbol(s); or (2) the fill_level_2 exceeds a second specified threshold high_thresh2 173 (e.g., 75-85% of its capacity, as a result of the write clock wrclk 132 being faster than the read clock rdclk2 134), in which case the central control unit 170 generates and provides a skip command on line 172, which again goes to the protocol-decode path 103 read side of memory unit 130 (specifically, to the memory unit 130 to the read 2 index control module 160), e.g., causing the read indices 162 and 163 to advance and skip over, essentially deleting, SKP symbol(s).

As will be readily apparent, a multiport implementation according to the present invention can achieve the following advantages: (1) an optimal solution in terms of chip area and power consumption, as it eliminates the replication of the memory unit in the elastic buffer (which otherwise would be required in conventional implementations that would require two separate buffers); (2) the ratio of the input and output clock frequencies or widths for the pair of read ports and the write port is not required to be an integer, but instead can be independently chosen; (3) low latency results, as such a structure can eliminate any need to use an additional gearbox for width translation.

Additional Considerations

In the preferred embodiments of a multiport elastic buffer module 120, each of the foregoing SKP insertions results in the insertion of 4 SKP symbols, and each of the foregoing SKP deletions results in the deletion of 4 SKP symbols.

The memory unit in each of the embodiments described above is implemented as an array of flip-flops or other single-bit memory elements. This configuration provides the greatest degree of control and, therefore, provides the most flexibility for interfacing between different clock domains. However, in alternate embodiments (e.g., in environments where such flexibility and/or granularity is not required), each separately addressable memory element can include 2 or more bits. In any event, each memory element in a memory unit according to the present invention preferably has fewer bits than a conventional memory unit (e.g., not more than 2 or 4 bits).

As used herein, the term "coupled", or any other form of the word, is intended to mean either directly connected or connected through one or more other components, elements or processing blocks, e.g., for the purpose of preprocessing. In the drawings and/or the discussions of them, where individual steps, components, modules or processing blocks are shown and/or discussed as being directly connected to each other, such connections should be understood as couplings, which may include additional steps, components, modules, elements and/or processing blocks. Unless otherwise expressly and specifically stated otherwise herein to the contrary, references to a signal herein mean any processed or unprocessed version of the signal. That is, specific processing steps discussed and/or claimed herein are not intended to be exclusive; rather, intermediate processing may be performed between any two processing steps expressly discussed or claimed herein, except to the extent expressly stated otherwise.

Whenever a specific value is mentioned herein, such a reference is intended to include that specific value or substantially or approximately that value. In this regard, the foregoing use of the word "substantially" is intended to encompass values that are not substantially different from the stated value, i.e., permitting deviations that would not have substantial impact within the identified context. As used herein, except to the extent expressly and specifically stated otherwise, the term "approximately" can mean, e.g.: within ±10% of the stated value or within ±20% of the stated value.

In the preceding discussion, the terms "operators", "operations", "functions" and similar terms refer to method or process steps or to hardware components, depending upon the particular implementation/embodiment.

Unless clearly indicated to the contrary, words such as "optimal", "optimize", "maximize", "minimize", "best", as well as similar words and other words and suffixes denoting comparison, in the above discussion are not used in their absolute sense. Instead, such terms ordinarily are intended to be understood in light of any other potential constraints, such as user-specified constraints and objectives, as well as cost and processing or manufacturing constraints.

In the above discussion, certain methods are explained by breaking them down into steps listed in a particular order. Similarly, certain processing is performed by showing and/or describing modules arranged in a certain order. However, it should be noted that in each such case, except to the extent clearly indicated to the contrary or mandated by practical considerations (such as where the results from one step are necessary to perform another), the indicated order is not critical but, instead, that the described steps and/or modules can be reordered and/or two or more of such steps (or the processing within two or more of such modules) can be performed concurrently.

References herein to a "criterion", "multiple criteria", "condition", "conditions" or similar words which are intended to trigger, limit, filter or otherwise affect processing steps, other actions, the subjects of processing steps or actions, or any other activity or data, are intended to mean "one or more", irrespective of whether the singular or the plural form has been used. For instance, any criterion or condition can include any combination (e.g., Boolean combination) of actions, events and/or occurrences (i.e., a multi-part criterion or condition).

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

As used herein, the words "include", "includes", "including", and all other forms of the word should not be understood as limiting, but rather any specific items following such words should be understood as being merely exemplary.

Several different embodiments of the present invention are described above and/or in any documents incorporated by reference herein, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the intent and the scope of the invention. Accordingly, the invention is not limited to the precise embodiments shown in the drawings and described above. Rather, it is intended that all such variations not departing from the intent of the invention are to be considered as within the scope thereof, as limited solely by the claims appended hereto.

System Environment.

In general, it should be noted that, except as expressly noted otherwise, any process, method, functionality, module, block, unit or similar item referenced herein can be implemented by a general-purpose processor executing computer-executable process steps (e.g., software and/or firmware), by dedicated (e.g., logic-based) hardware, or any combination of these approaches, with the particular implementation being selected based on known engineering tradeoffs. That is, where any process and/or functionality described above is implemented in a fixed, predetermined and/or logical manner, it can be accomplished by a processor executing programming (e.g., software or firmware), an appropriate arrangement of logic components (hardware), or any combination of the two, as will be readily appreciated by those skilled in the art. In other words, it is well-understood how to convert logical and/or arithmetic operations into instructions for performing such operations within a processor and/or into logic gate configurations for performing such operations; in fact, compilers typically are available for both kinds of conversions.

It should be understood that the present invention also relates to machine-readable tangible (or non-transitory) media on which are stored software or firmware program instructions (i.e., computer-executable process instructions) for performing the methods and functionality and/or for implementing the modules and components of this invention. Such media include, by way of example, magnetic disks, magnetic tape, optically readable media such as CDs and DVDs, or semiconductor memory such as various types of memory cards, USB flash memory devices, solid-state drives, etc. In each case, the medium may take the form of a portable item such as a miniature disk drive or a small disk, diskette, cassette, cartridge, card, stick etc., or it may take the form of a relatively larger or less-mobile item such as a hard disk drive, ROM or RAM provided in a computer or other device. As used herein, unless clearly noted otherwise, references to computer-executable process steps stored on a computer-readable or machine-readable medium are intended to encompass situations in which such process steps are stored on a single medium, as well as situations in which such process steps are stored across multiple media.

We claim:

1. An elastic buffer module, comprising:
   a memory unit configured as an array of memory elements;
   a write index control module that specifies a range of the memory elements into which a write word from a sequence of input words within input data is to be written into the memory unit; and
   a read index control module that specifies a range of the memory elements from which a read word is to be read from the memory unit and output as part of a sequence of read words in output data, wherein the input words have a first bit width, the read words have a second bit width, the second bit width is a non-integer multiple of the first bit width, and the first bit width is a non-integer multiple of the second bit width;

wherein the input words are sequentially written into the memory unit at a first clock rate, the read words are sequentially read from the memory unit at a second clock rate, the second clock rate is a non-integer multiple of the first clock rate, and the first clock rate is a non-integer multiple of the second clock rate.

2. The elastic buffer module according to claim 1, wherein the memory elements are separately addressable single-bit memory elements.

3. The elastic buffer module according to claim 1: wherein the first bit width times the first clock rate is equal to the second bit width times the second clock rate.

4. The elastic buffer module according to claim 1, further comprising a central control unit that detects low-buffer-fill and high-buffer-fill conditions and, in response, causes clock-skew-correction symbols to be inserted or deleted, in order to maintain a desired buffer-fill-level range.

5. The elastic buffer module according to claim 4, wherein when the low-buffer-fill condition is detected, at least one additional clock-skew-correction symbol, not within the input data, is written into the memory unit, and when the high-buffer-fill condition is detected, at least one clock-skew-correction symbol within the input data is omitted from being written into the memory unit.

6. The elastic buffer module according to claim 5, wherein when the high-buffer-fill condition is detected, data writing is paused.

7. The elastic buffer module according to claim 5, wherein when the high-buffer-fill condition is detected, only a subset of the bits in the write word are written into the memory unit.

8. An elastic buffer module, comprising:

a memory unit configured as an array of separately addressable single-bit memory elements;

a write index control module that specifies a range of the single-bit memory elements into which a write word from a sequence of input words within input data is to be written into the memory unit;

a read index control module that specifies a range of the single-bit memory elements from which a read word is to be read from the memory unit and output as part of a sequence of read words in output data; and a central control unit that detects low-buffer-fill and high-buffer-fill conditions and, in response, causes clock-skew-correction symbols to be inserted or deleted, in order to maintain a desired buffer-fill-level range.

9. The elastic buffer module according to claim 8, wherein the input words are sequentially written into the memory unit at a first clock rate, the read words are sequentially read from the memory unit at a second clock rate, the second clock rate is a non-integer multiple of the first clock rate, and the first clock rate is a non-integer multiple of the second clock rate.

10. The elastic buffer module according to claim 8, wherein when the low-buffer-fill condition is detected, at least one additional clock-skew-correction symbol, not within the input data, is written into the memory unit, and when the high-buffer-fill condition is detected, at least one clock-skew-correction symbol within the input data is omitted from being written into the memory unit.

11. The elastic buffer module according to claim 10, wherein when the high-buffer-fill condition is detected, data writing is paused.

12. The elastic buffer module according to claim 10, wherein when the high-buffer-fill condition is detected, only a subset of the bits in the write word are written into the memory unit.

13. An elastic buffer module, comprising:

a memory unit configured as an array of memory elements;

a write index control module that specifies a write range of the memory elements into which a write word from a sequence of input words within input data is to be written into the memory unit;

a first read index control module that specifies a first range of the memory elements from which a first read word is to be read from the memory unit and output as part of a first sequence of read words in output data; and a second read index control module that specifies a second range of the memory elements from which a second read word is to be read from the memory unit as part of a second sequence of read words, wherein the write word has a write bit width, the first read word has a first read bit width, and the second read word has a second read bit width, and wherein at least one of the first and second read bit widths is a non-integer multiple of the write bit width, and the write bit width is a non-integer multiple said at least one of the first and second read bit widths.

14. The elastic buffer module according to claim 13, wherein the memory elements are separately addressable single-bit memory elements.

15. The elastic buffer module according to claim 13, wherein the input words are sequentially written into the memory unit at a write clock rate, the first read words are sequentially read from the memory unit at a first read clock rate, the second read words are sequentially read from the memory unit at a second read clock rate, and wherein the write clock rate is a non-integer multiple of at least one of the first read clock rate or the second read clock rate, and said at least one of the first read clock rate or the second read clock rate is a non-integer multiple of the write clock rate.

16. The elastic buffer module according to claim 15, wherein the write bit width times the write clock rate is equal to the first read bit width times the first read clock rate and is equal to the second read bit width times the second read clock rate.

17. The elastic buffer module according to claim 13, further comprising:

a first central control unit that detects first low-buffer-fill and first high-buffer-fill conditions and, in response, causes clock-skew-correction symbols to be inserted or deleted, in order to maintain a desired first buffer-fill-level range, relative to reading of the first read words; and a second central control unit that detects second low-buffer-fill and second high-buffer-fill conditions and, in response, causes clock-skew-correction symbols to be inserted or deleted, in order to maintain a second desired buffer-fill-level range, relative to reading of the second read words.

18. The elastic buffer module according to claim 17, wherein when the first low-buffer-fill condition is detected, at least one additional clock-skew-correction symbol, not read from the memory unit, is inserted into the output data, when the first high-buffer-fill condition is detected, the first range is advanced, thereby skipping reading at least one clock-skew-correction symbol within the memory unit, when the second low-buffer-fill condition is detected, at least one additional clock-skew-correction symbol, not read from the memory unit, is inserted into the second sequence of read words, and when the second high-buffer-fill condition is detected, the second range is advanced, thereby skipping reading at least one clock-skew-correction symbol within the memory unit.

\* \* \* \* \*